United States Patent [19]

Nakayama et al.

[11] Patent Number: 5,067,083
[45] Date of Patent: Nov. 19, 1991

[54] VEHICLE DRIVING AZIMUTH DETECTING APPARATUS FOR CORRECTING A DISTURBED GEOMAGNETIC AZIMUTH

[75] Inventors: Okihiko Nakayama, Kamakura; Hiroshi Tsuda, Yokohama, both of Japan

[73] Assignee: Nissan Motor Co., Ltd., Yokohama, Japan

[21] Appl. No.: 316,836

[22] Filed: Feb. 28, 1989

[30] Foreign Application Priority Data

Feb. 29, 1988 [JP] Japan ................................ 63-47189

[51] Int. Cl.⁵ .............................................. G06F 15/50
[52] U.S. Cl. ...................................... 364/453; 340/995; 73/178 R
[58] Field of Search ............ 364/559, 449, 450, 457, 364/571.05, 453, 571.01, 571.03, 575, 454; 73/1 E, 178 R; 340/995, 988; 33/356

[56] References Cited

U.S. PATENT DOCUMENTS

| | | | |
|---|---|---|---|
| 4,347,730 | 9/1982 | Fisher et al. | 364/571.05 |
| 4,481,596 | 11/1984 | Townzen | 364/571.05 |
| 4,521,777 | 6/1985 | Nakamura et al. | 364/449 |
| 4,608,656 | 8/1986 | Tanaka et al. | 364/449 |
| 4,673,878 | 6/1987 | Tsushima et al. | 364/449 |
| 4,688,176 | 8/1987 | Hirata | 364/449 |
| 4,771,547 | 9/1988 | Akutsu et al. | 33/356 |
| 4,831,563 | 5/1989 | Ando et al. | 364/571.05 |
| 4,887,081 | 12/1989 | Iihoshi et al. | 73/178 R |
| 4,977,679 | 12/1990 | Saito et al. | 364/453 |
| 4,989,151 | 1/1991 | Nuimura | 340/995 |

FOREIGN PATENT DOCUMENTS

58-34483 2/1983 Japan.

*Primary Examiner*—Parshotam S. Lall
*Assistant Examiner*—Michael Zanelli
*Attorney, Agent, or Firm*—Foley & Lardner

[57] ABSTRACT

In an apparatus for detecting a driving azimuth of a vehicle, a gyroscopic sensor signal and a geomagnetic sensor signal are acquired. When the vehicle is driven in a disturbed geomagnetic area such as a straight road, the acquired geomagnetic sensor signal does not correctly reflect the actual driving azimuth of the vehicle. Moreover, the gyroscopic sensor signal drifts over time. When the vehicle is in such a disturbed geomagnetic area, a variation amount in the acquired geomagnetic sensor signals is subtracted from another variation amount in the acquired gyroscopic sensor signals to obtain a driving azimuth similar to the actual driving azimuth.

5 Claims, 11 Drawing Sheets

FIG.1
PRIOR ART

L : ERROR
P : ACTUAL AZIMUTH
Q : AZIMUTH BY GYRO SENSOR
R : AZIMUTH BY GEOMAGNETIC SENSOR
S1, S2 : THRESHOLD LEVELS

VEHICLE DRIVING AZIMUTH DETECTING APPARATUS FOR CORRECTING A DISTURBED GEOMAGNETIC AZIMUTH

BACKGROUND OF THE INVENTION

1. Field of the Invention

The present invention relates to an apparatus for detecting a present driving azimuth of a vehicle and, more particularly, to a navigation apparatus capable of detecting an accurate driving azimuth of a vehicle without being adversely influenced by a disturbed geomagnetism or terrestrial magnetism.

2. Description of the Related Art

Various types of driving azimuth (direction) detecting apparatuses for vehicles have been known. For instance, there has been known an apparatus disclosed in Japanese KOKAI patent application No. 58-34483 opened on Feb. 28, 1983.

In such a known azimuth detecting apparatus, a present driving azimuth of a vehicle is detected by using a combination of a geomagnetic sensor which can detect an absolute azimuth of a vehicle and a gyroscopic sensor which can detect a variation in a relative azimuth of the vehicle.

Figure 1:
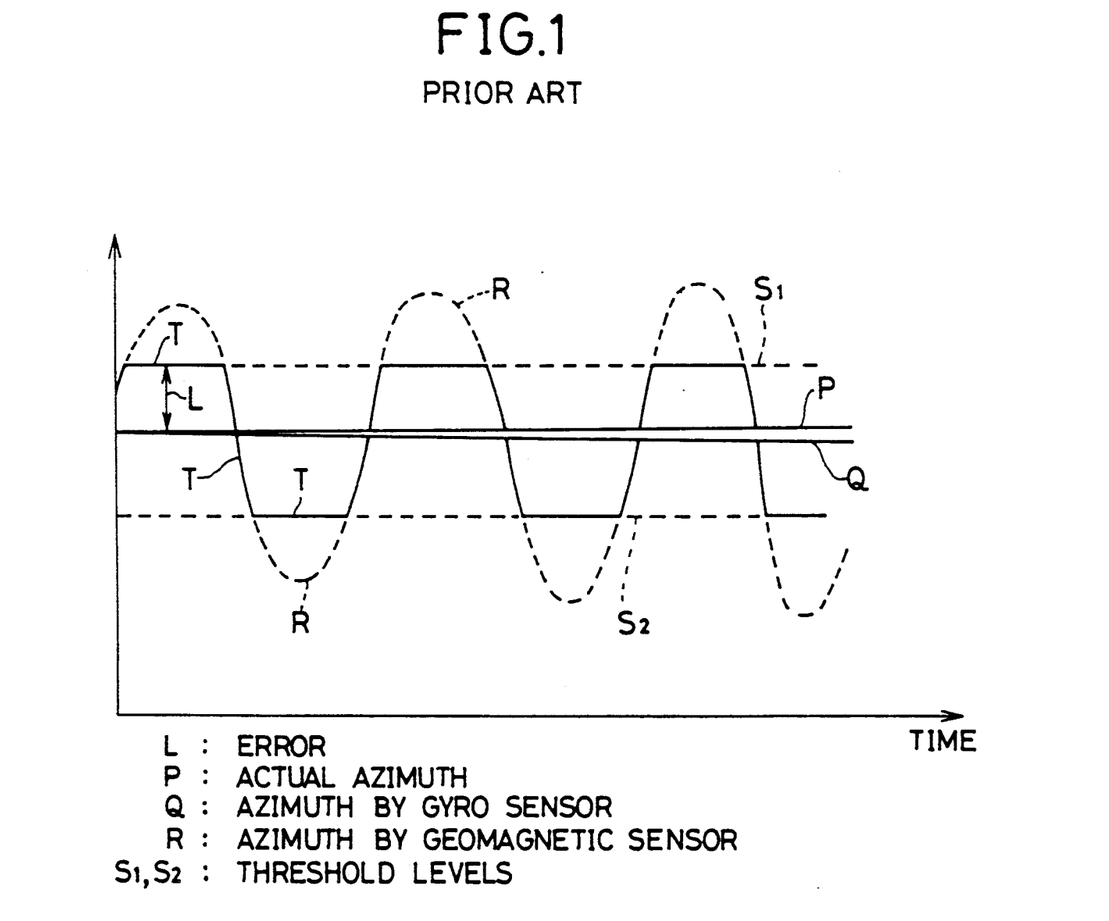
FIG. 1 illustrates azimuth detections of the conventional driving azimuth detecting apparatus.

The above-described conventional azimuth detecting apparatus will now be described with reference to FIG. 1. In a case where a vehicle is driven on, for instance, "a straight road" under a disturbed geomagnetic field condition, assuming that an actual driving azimuth of the vehicle is set to "P", the gyroscopic azimuth detected by the gyroscopic sensor corresponds to a stable straight line "Q" since it is not adversely influenced by the geomagnetic fields around the vehicle. However, in FIG. 1, the straight line "Q" is slightly deviated from the actual azimuth "P" because of the influence of a zero-point drift.

On the other hand, in the above azimuth detecting apparatus, the geomagnetic azimuth detected by the geomagnetic sensor is adversely influenced by such circumferential geomagnetic fields and fluctuates while drawing a sine curve "R".

Therefore, if such a geomagnetic azimuth is directly used as a vehicle driving azimuth in response to an output of the geomagnetic sensor, an error (indicated by "L" in FIG. 1) between the geomagnetic azimuth and the actual azimuth "P" becomes very large.

Therefore, in the azimuth detecting apparatus, obtaining a difference between the absolute azimuth "R" detected by the geomagnetic sensor and the relative azimuth "Q" detected by the gyroscopic sensor, enables two threshold levels "$S_1$" and "$S_2$" to be set. When the geomagnetic azimuth "R" detected by the geomagnetic sensor exceeds the threshold levels "$S_1$" and "$S_2$", this azimuth "R" of the geomagnetic sensor is corrected so as to equalize the azimuth "R" to the threshold levels "$S_1$" and "$S_2$" and a corrected geomagnetic azimuth "T" is set to the present driving azimuth of the vehicle.

However, in such a conventional azimuth detecting apparatus, even if the error in the geomagnetic azimuth which is detected by the geomagnetic sensor is corrected and reduced to the threshold levels "$S_1$" and "$S_2$", the large error ("L" in FIG. 1) with respect to the actual azimuth "P" still remains.

Therefore, in the case where the present location of the driving vehicle is calculated by using the above-described corrected geomagnetic azimuth as a reference, there is one problem such that the above-explained errors are accumulated.

In the foregoing conventional azimuth detecting apparatus, the gyroscopic sensor is used only to set the threshold levels and also is merely used to obtain the stable geomagnetic sensor output value. Thus, there is another problem such that the inherent merit of the gyroscopic sensor cannot be utilized effectively. That is, the relative azimuth variation amount can be accurately detected without being adversely influenced by the geomagnetic field condition.

SUMMARY OF THE INVENTION

The present invention has been made in an attempt to solve these conventional problems, and has an object of the present invention to provide a vehicle driving azimuth detecting apparatus in which by using a gyroscopic sensor which can accurately detect a variation amount in a relative azimuth of a vehicle, a geomagnetic azimuth detected by a geomagnetic sensor is properly corrected, and even while driving the vehicle under the disturbed geomagnetic field condition, the present driving azimuth of the vehicle can be detected at a high precision.

To achieve the above object of the invention, a vehicle driving azimuth detecting apparatus comprises:

a first detecting means 12 for detecting a geomagnetic azimuth of the driving vehicle to produce a first variation amount at a plurality of geomagnetic azimuths;

a second detecting means 14 for detecting a gyroscopic azimuth of the driving vehicle to produce a second variation amount at a plurality of gyroscopic azimuths;

a third detecting means 16 for detecting a geomagnetic condition around the vehicle by calculating a difference between the first variation amount in the geomagnetic azimuths and the second variation amount in the gyroscopic azimuths so as to output a signal representative of the geomagnetic conditions around the vehicle; and, a fourth detecting means 18 for detecting the present driving azimuth of the vehicle by processing the difference in the first and second variation amounts based upon the geomagnetic condition signal.

BRIEF DESCRIPTION OF THE DRAWINGS

FIGS. 5 to 7A and 7B are flowcharts for explaining the processing operations of the navigation system of FIG. 3.

DETAILED DESCRIPTION OF THE PREFERRED EMBODIMENTS

Basic Idea

Figure 2:
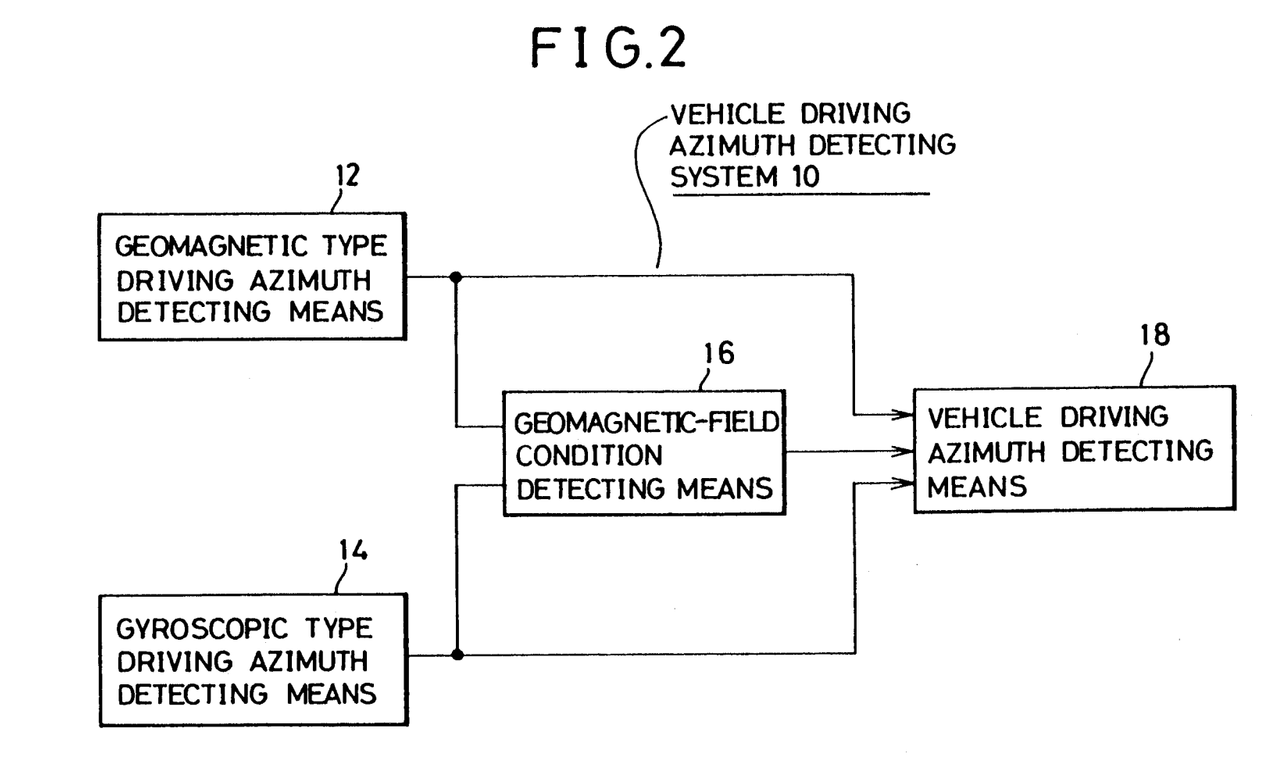
FIG. 2 is a block diagram showing a basic idea of the present invention.

Before proceeding with various types of preferred embodiments, a basic idea of the invention will now be described with reference to FIG. 2.

A vehicle driving azimuth detecting system 10, employing the basic idea of the invention, includes a geomagnetic type driving azimuth detecting means 12, a gyroscopic type driving azimuth detecting means 14, a geomagnetic-field condition detecting means 16, and a vehicle driving azimuth detecting means 18.

In the geomagnetic type driving azimuth detecting means 12, a driving azimuth of a vehicle is detected by a detector such as a geomagnetic sensor.

In the gyroscopic type driving azimuth detecting means 14, the driving azimuth of this vehicle is detected by another detector such as a gyroscopic sensor.

In the geomagnetic-field condition detecting means 16, the geomagnetic-field condition around the driving vehicle is detected by calculating a difference between a variation amount in the geomagnetic azimuth detected by the geomagnetic type driving azimuth detecting means 12 every predetermined time unit, and a variation amount in the gyroscopic azimuth detected by the gyroscopic type driving azimuth detecting means 14.

In the vehicle driving azimuth detecting means 18, the present (corrected) driving azimuth of the vehicle is detected by processing the detected geomagnetic azimuth on the basis of the result of the detection by the magnetic-field condition detecting means 16.

In the foregoing vehicle driving azimuth detecting system system 10, as mentioned above, by calculating the difference between the variation amount of the geomagnetic azimuth detected by the geomagnetic sensor every predetermined time unit, and the variation amount of the gyroscopic azimuth detected by the gyroscopic sensor, the geomagnetic-field condition around the driving vehicle is detected. On the basis of the resultant difference, when the geomagnetic-field condition is bad, the calculated vehicle azimuth is made to approach the geomagnetic azimuth more slowly in view of the time lapse. To the contrary, when the geomagnetic-field condition is good, the calculated vehicle azimuth is made to approach the geomagnetic azimuth earlier in view of the time lapse. Therefore, there are particular advantages such that the accurate absolute (geomagnetic) azimuth can be detected without being adversely influenced by the disturbance of the geomagnetism, and thereby the present azimuth of the vehicle can be detected at a high precision.

ARRANGEMENT OF VEHICLE DRIVING AZIMUTH DETECTOR

Figure 3:
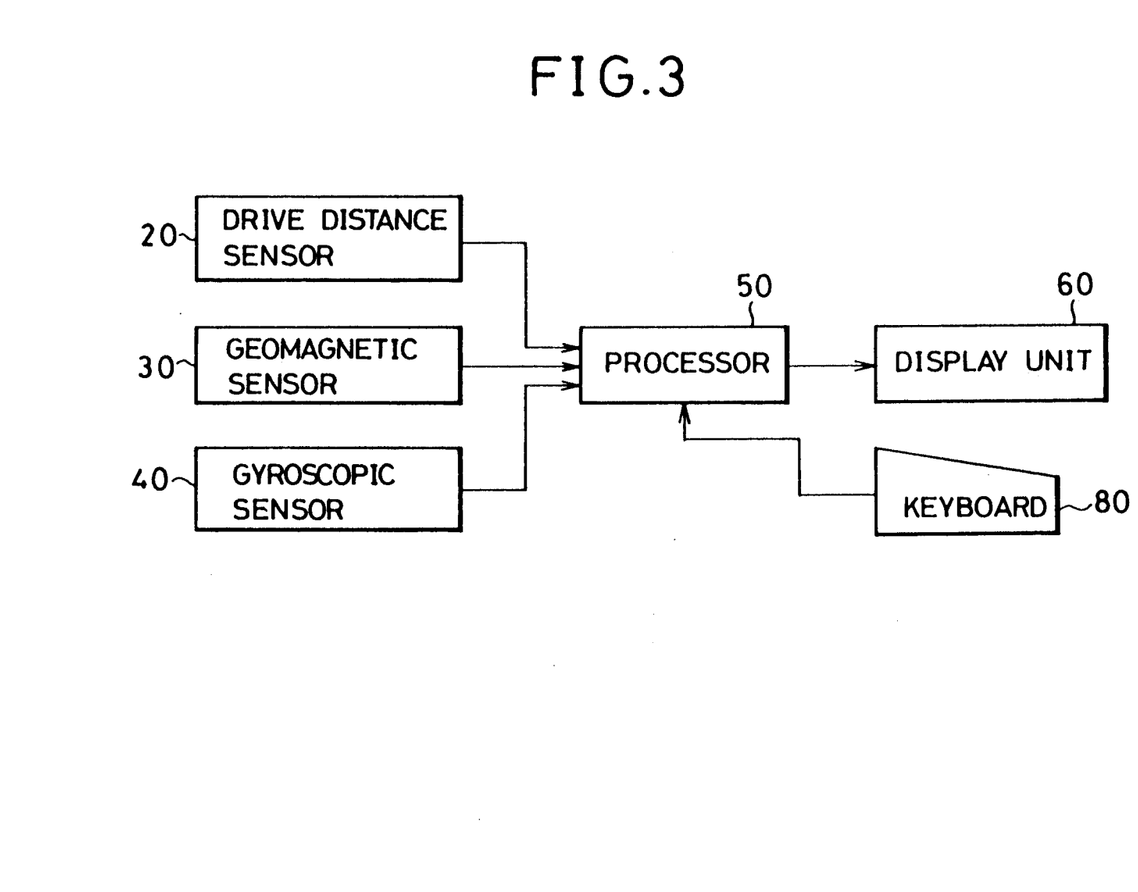
FIG. 3 is a block diagram showing a navigation system according to a first preferred embodiment according to the invention.

FIG. 3 is an arrangement diagram of a vehicle driving azimuth detecting apparatus to which the invention is applied. To a processor 50, the following sensor signals are supplied: An output of a drive distance sensor 20 which is of the photoelectric type, electromagnetic type, mechanical contact type, or the like for outputting a pulse signal proportional to a rotating speed of a tire of a vehicle (not shown) and which generates a signal representative of the driving distance of the vehicle, an output of a geomagnetic sensor 30 for outputting a signal of an absolute azimuth according to the driving azimuth of the vehicle, and an output of a rate type gyroscopic sensor 40 for outputting a signal proportional to an azimuth or azimuth change amount according to the driving azimuth of the vehicle. These signals are input to the processor 50.

On the other hand, the processor 50 counts the number of pulse signals derived from the drive distance sensor 20 and detects the drive distance of the vehicle. The processor 50 also detects the driving azimuth of the vehicle by the azimuth signals which are output from the geomagnetic sensor 30 and gyroscopic sensor 40. On the basis of the results of the detection, the processor 50 obtains a position on two-dimensional coordinates of a display unit 60 every unit drive distance of the vehicle by an arithmetic operation.

The display unit 60 comprises a CRT display device, a liquid crystal display device, or the like and time-sequentially updates and displays the present location of the vehicle on the basis of the position data on the two-dimensional coordinates which is obtained by the processor 50 and continuously changes. A keyboard 80 to input various kinds of data is connected to the processor 50.

INTERNAL CIRCUIT OF PROCESSOR

Figure 4:
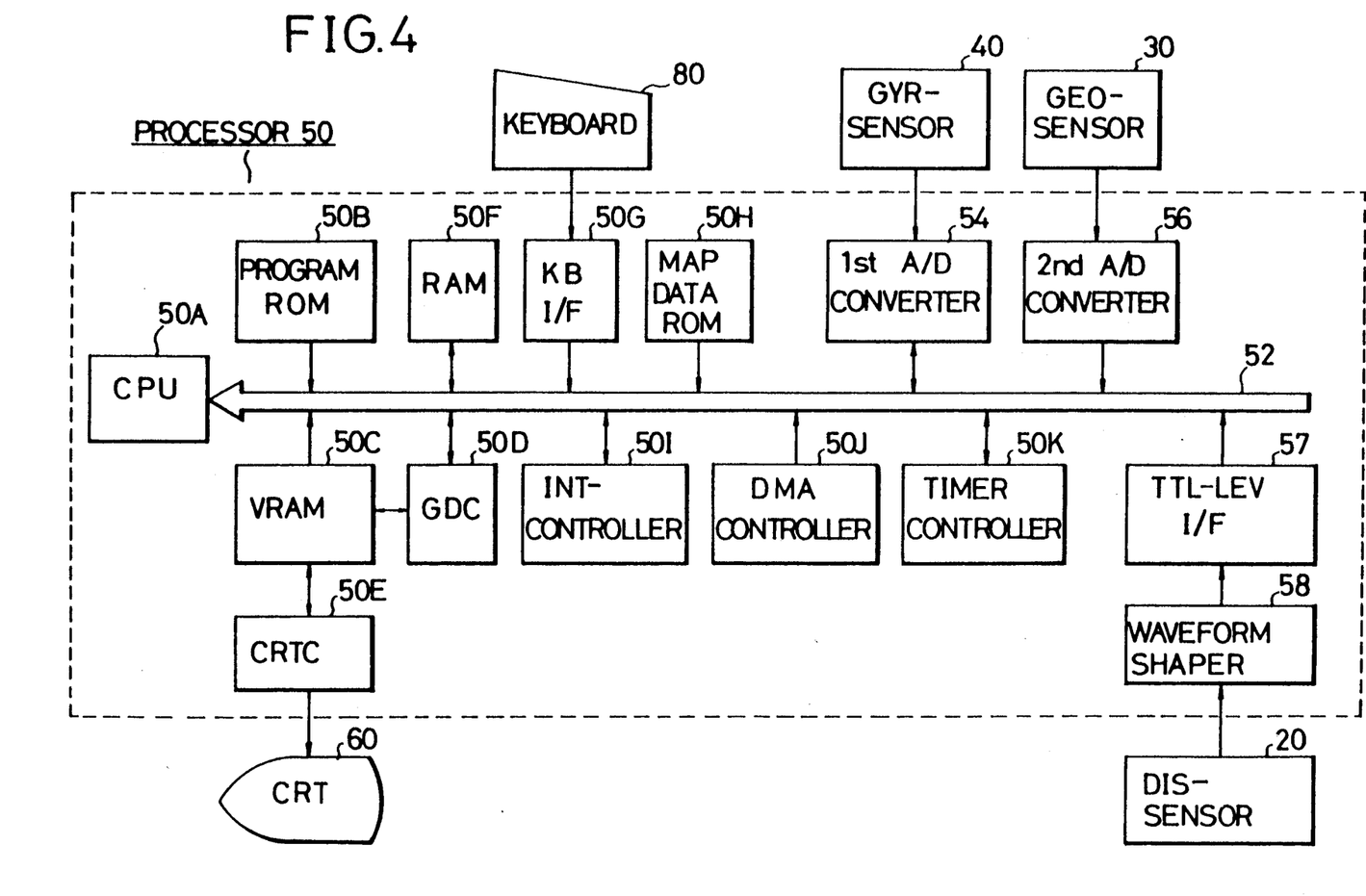
FIG. 4 is an internal circuit diagram of a processor shown in FIG. 3.

Referring now to FIG. 4, an internal circuit of the processor 50 illustrated in FIG. 3 will now be described.

In the processor 50, a central processing unit (CPU) 50A is employed. Furthermore, this processor 50 includes a program ROM (read only memory) 50B for previously storing a system program; a VRAM (visual random access memory) 50C; a graphic display controller 50D; a CRT (cathode-ray tube) controller 50E; and a RAM 50F, which are connected via a data bus 52 to CPU 50A. The CRT controller 50E is also connected to the above-described display unit 60. The processor 50 further includes a keyboard interface 50G connected to the keyboard 80; a map data ROM 50H; an interrupt controller 50I; a DMA (direct memory access) controller 50J and a timer controller 50K, which are also connected to CPU 50A via the data bus 52. The map data ROM 50H previously stores the map data and transfers this map data via VRAM 50C to the display unit 60. Under the control of the graphic display controller 50D, the map data is processed and temporarily stored in VRAM 50C. Thereafter, the proper map data is displayed on the display unit 60. The function of the interrupt controller 50I is to perform both an accumulated drive-distance calculation and an azimuth calculation in the interrupt mode (will be discussed later in detail).

The processor 50 also includes a first A/D (analog-to-digital) converter 54 connected to the gyroscopic sensor 40; a second A/D converter 56 connected to the geomagnetic sensor 30; a TTL-level interface 57; and a waveform shaper 58 connected to the drive distance sensor 20. These circuit elements are similarly connected via the data bus 52 to CPU 50A.

A gyroscopic sensor signal derived from the gyroscopic sensor 40 is A/D-converted in the first A/D converter 54 into the corresponding gyroscopic data, whereas a geomagnetic sensor signal derived from the geomagnetic sensor 30 is similarly A/D-converted in the second A/D converter 56 into the corresponding geomagnetic data. A drive-distance signal derived from the drive distance sensor 20 is shaped in the waveform shaper 58 and the signal level of the shaped drive distance signal is adjusted in the TTL-level interface 57 to obtain the proper TTL level thereof.

OVERALL OPERATION

The overall operation of the vehicle azimuth detecting apparatus according to the preferred embodiment shown in FIG. 3 will now be described with reference to a flowchart of FIG. 5.

The system of FIG. 3 starts operating by reading out the system program from the program ROM 50B in FIG. 4. The initialization is executed in step 100 shown in FIG. 5. When the present location of the vehicle is set by the key-input of the keyboard 80 (step 102), the present location of the vehicle and the map showing the present position of the vehicle are displayed on the display unit 60 (step 104).

In the next step 106, the interrupting operations defined in steps 108 and 110 are allowed and the processing routine is advanced to the following main loop.

In the main loop, the drive distance at every driving of a predetermined distance is accumulated and the present location of the vehicle and the map showing the present position of the vehicle are updated. That is, when the vehicle has moved from the present location (YES in step 112), the present location of the vehicle and the map are updated (step 114) by executing the accumulated drive-distance calculation interrupting process (step 108) and azimuth calculation interrupting process (step 110).

CALCULATION ON ACCUMULATED DRIVE DISTANCE

Figure 5:
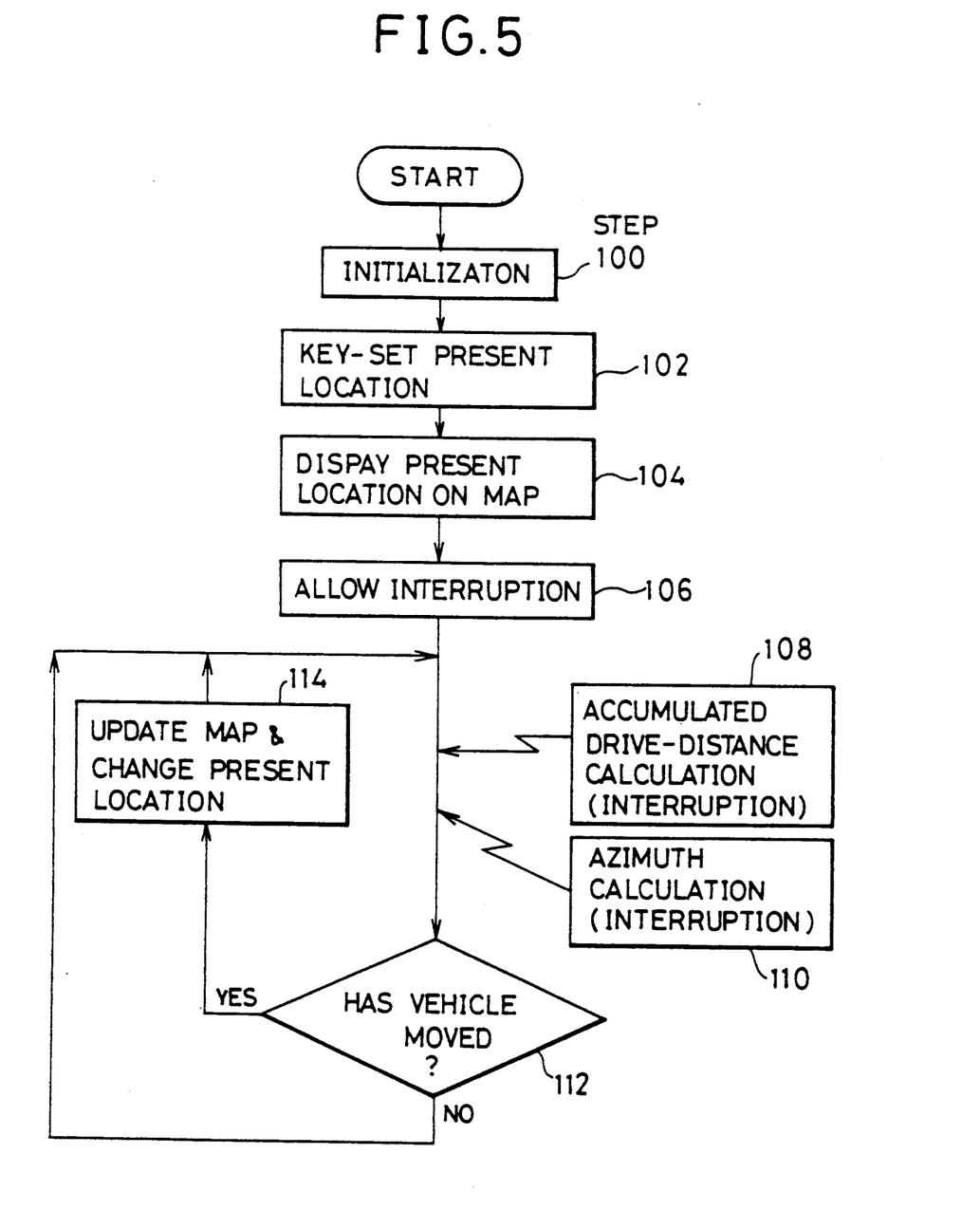
Figure 6:
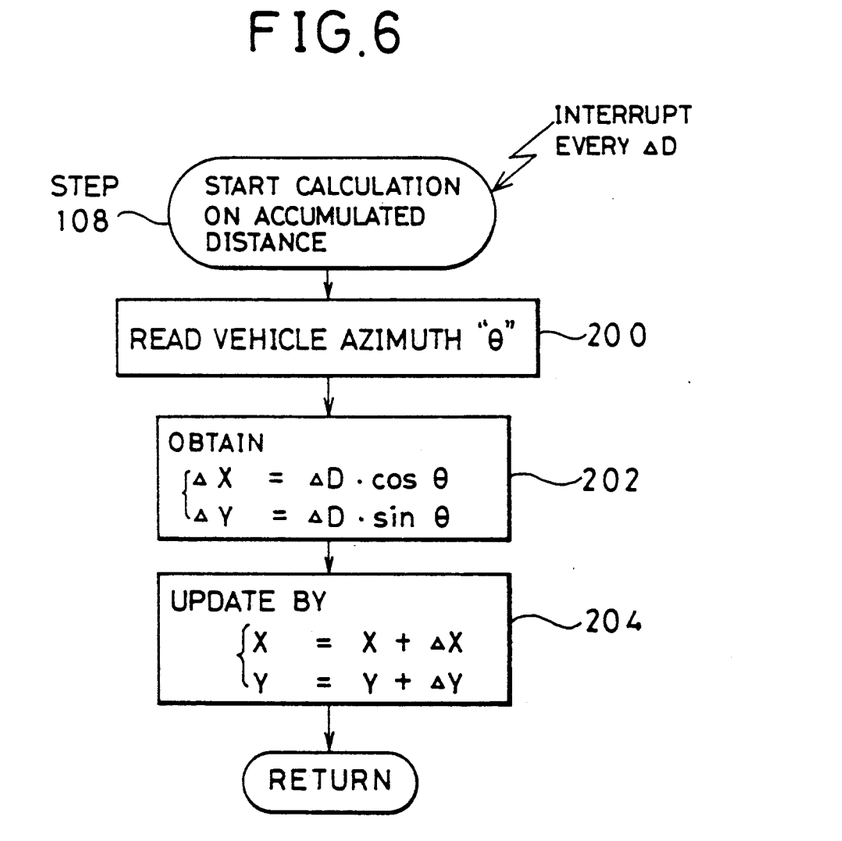

FIG. 6 is a flowchart showing a processing method of the accumulated drive-distance calculation interrupting process defined in step 108 in FIG. 5. The process is executed each time the vehicle has moved by a predetermined distance "$\Delta D$" and a vehicle velocity pulse is generated from the drive distance sensor 20 shown in FIG. 3.

That is, a vehicle azimuth "$\theta$" is read by the CPU 52 in FIG. 4 in step 200. In this case, the vehicle azimuth which was detected and stored by the process in step 110 (will be explained hereinlater) is read out as the present vehicle azimuth "$\theta$".

Thus, the components in the X and Y directions of the predetermined distance "$\Delta D$" are obtained (step 202). Finally, both components are added to the accumulated distances in the X and Y directions and their previously accumulated distances are updated (step 204).

When the foregoing interrupting processes defined in FIG. 6 are executed, the coordinate position indicated by the newest accumulating processes in the X and Y directions is processed as the present drive position of the vehicle in the interruption processes in FIG. 5.

CALCULATION ON AZIMUTH

In the azimuth detecting apparatus of the embodiment of FIG. 3, the vehicle driving azimuth "$\theta$" which is used in the previous step 108 in the flowchart shown in FIG. 5 is obtained by the azimuth calculation interrupting process in step 110 in FIG. 5.

Figure 7A:
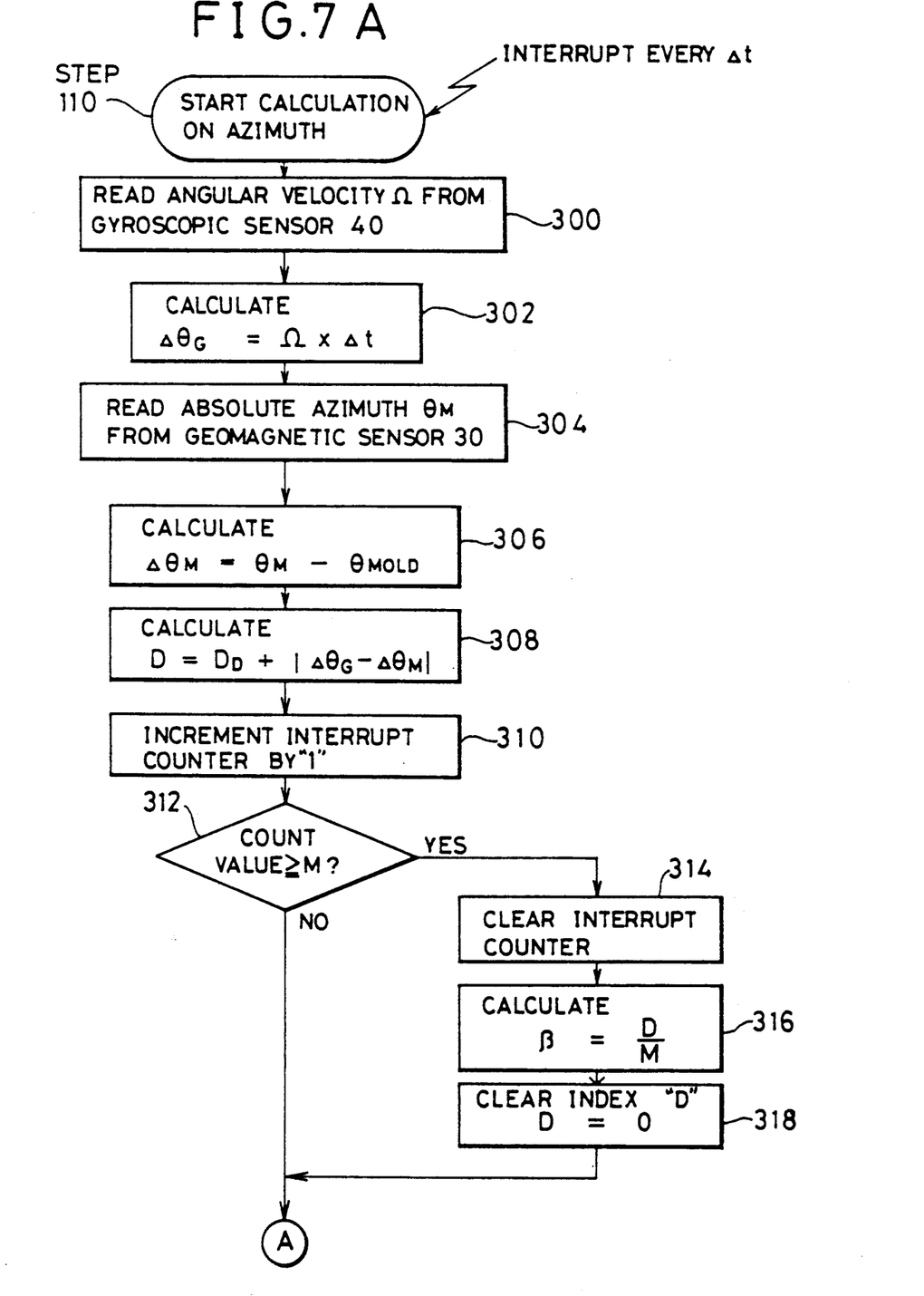
Figure 7B:
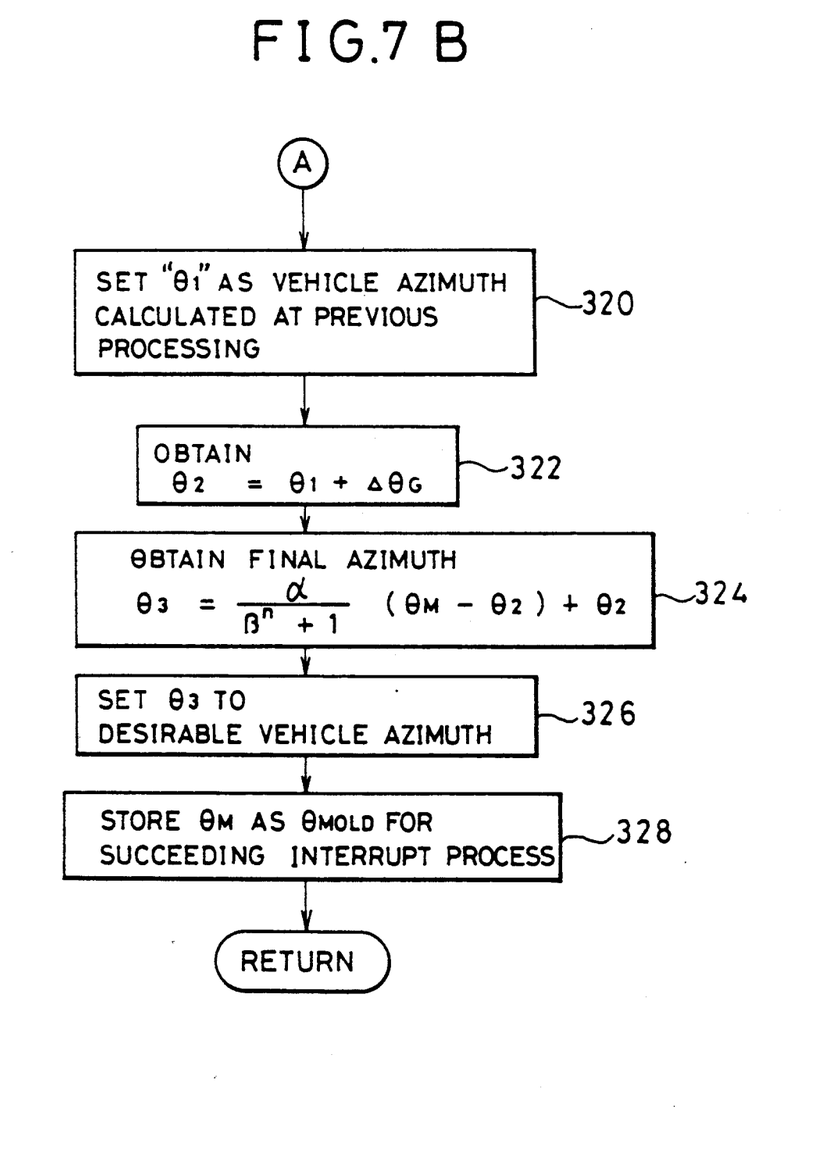

This process is the timer interrupting process which is executed every predetermined time lapse "$\Delta t$". The interruption process procedure in step 110 will now be described in detail hereinbelow with reference to a flowchart of FIG. 7.

In this processing routine, an angular velocity "$\Omega$" is output from the gyroscopic sensor 40 (FIG. 3), and then is A/D-converted by a first A/D converter 54 in FIG. 4 and, thereafter, a predetermined coefficient is multiplied with the digital value, so that the angular velocity data is obtained.

Next, by multiplying the predetermined time "$\Delta t$" with the angular velocity "$\Omega$" obtained as mentioned above, a variation amount "$\Delta \theta_G$" in the gyroscopic azimuth between one gyroscopic azimuth at the previous processing time and another gyroscopic azimuth at the present processing time is calculated (step 302).

Next, an absolute (geomagnetic) azimuth "$\theta_M$" of the vehicle at that time instance is read out from the geomagnetic sensor 30 and an absolute azimuth "$\theta_{MOLD}$" acquired at the previous reading time (before $\Delta t$) is also read, thereby obtaining a variation amount "$\theta_M$" in the geomagnetic azimuth by the geomagnetic sensor 30 between one geomagnetic azimuth at the previous processing time and another geomagnetic azimuth at the present processing time (steps 304 and 306).

As mentioned above, when the azimuth variation amounts "$\Delta \theta_G$" and "$\Delta \theta_M$" which are detected by the gyroscopic sensor 40 and geomagnetic sensor 30 respectively after the elapse of the predetermined time "$\Delta t$" are obtained, an absolute value $|\Delta \theta_G - \Delta \theta_M|$ of the difference between "$\Delta \theta_G$" and "$\Delta \theta_M$" is calculated and added to an index "D" which was obtained previously, thereby obtaining the index D to judge the geomagnetic-field conditions around the vehicle (step 308).

It should be noted that since $|\Delta \theta_G - \Delta \theta_M|$ is the difference between the azimuth variation amounts obtained by the gyroscopic sensor 40 and geomagnetic sensor 30, it is determined that the geomagnetic conditions for the period of time from the previous processing time to the present processing time are good as the absolute value of the difference is small. To the contrary, as the absolute difference value is large, it is understood that the geomagnetic conditions are bad.

Therefore, in principle, the absolute difference value can be set as the index indicative of the good or bad geomagnetic conditions around the driving vehicle. However, since the time period "$\Delta t$" is the extremely short time such as 50 msec, it is presumed that such an absolute difference value fairly fluctuates every processing time.

Therefore, in the apparatus of the embodiment, the value of "D" is detected "M" ($M \geq 2$) times and its average value is set to another index (steps 310 to 318).

That is, each time this processing routine is executed, the count value of an interruption counter (not shown in detail) is incremented by "1" (step 310). When the count value becomes M or more (YES in step 312), the arithmetic operation of the following equation (1) is executed to calculate the average value "$\beta$" (step 316).

$$\beta = D/M \tag{1}$$

(where, $D = D + |\Delta \theta_G - \Delta \theta_M|$)

When the average value "$\beta$" is calculated as mentioned above, the interruption counter and index "D" are cleared (steps 314 and 318), thereby preparing for the subsequent interruption arithmetic operation.

The average value "$\beta$" is used as the index indicative of the good or bad geomagnetic conditions in a manner similar to the above-described index "D". As already mentioned above, if the geomagnetic conditions around the vehicle are good, the value of "$\beta$" is small, whereas if they are bad, the value of "$\beta$" is large. The derived vehicle driving azimuth "$\theta$" is obtained by the processes in step 320 and subsequent steps hereinafter. First, the vehicle azimuth calculated at the previous processing time is set to "$\theta_1$" (step 320). The gyroscopic azimuth variation amount "$\Delta \theta_G$" detected by the gyroscopic sensor 3 after the elapse of time "$D_t$" is added to "$\theta_1$", thereby obtaining another azimuth "$\theta_2$" (step 322).

This azimuth "$\theta_2$" corresponds to a vehicle azimuth mainly defined by only the gyroscopic sensor 40. Therefore, it is not adversely influenced by the geomagnetic-field conditions around the vehicle and the driving azimuth can be detected at a fairly high accuracy on the basis of such a vehicle azimuth if considering a short time period. However, the driving azimuth is gradually deviated due to the adverse influence by the zero-point drift of the gyroscopic sensor when considering a long time period (refer to FIG. 10). It should be noted that since the low-cost gyroscopic sensor is employed, a degree of this zero-point drift is inherently high. However, such a higher zero-point drift can be corrected according to the invention (will be discussed later).

Therefore, in the apparatus according to the preferred embodiment, the resultant azimuth "$\theta_2$" is not directly used as the final driving azimuth but an azimuth "$\theta_3$" corrected by the following equation (2) is set to the final (desired) driving azimuth (step 324).

$$\theta_3 = \{\alpha/(\beta^n + 1)\} \cdot (\theta_M - \theta_2) + \theta_2 \qquad (2)$$

In the equation (2), "$\beta$" is obtained by the previous equation (1) and is set to another index to distinguish the good or bad geomagnetic conditions. When "$\beta$"=0, the geomagnetic conditions are best. As the value of "$\beta$" becomes large, the geomagnetic conditions, become bad.

"$\alpha$" in the equation (2) is a constant having a value of: $0 \leq \alpha \leq 1$.

As the value of "$\alpha$" approaches 0, the final driving azimuth (corrected azimuth) "$\theta_3$" approaches the gyroscopic azimuth detected by the gyroscopic sensor 40. That is, when $\alpha=0$, then $\theta_3=\theta_2$.

On the other hand, as the value of "$\alpha$" approaches 1, the corrected azimuth "$\theta_3$" approaches the geomagnetic azimuth detected by the geomagnetic sensor 30. That is, when $\alpha=1$, then $\theta_3=\theta_M$.

On the other hand, since "$\beta$" is raised to the n-th power by using the constant "n" in the equation (2), as the value of "n" becomes large, the instability of the geomagnetic conditions is more reflected to the final azimuth $\theta_3$.

In other words, the equation (2) indicates at which speed (i.e., a time duration) the vehicle azimuth is made coincident with the geomagnetic azimuth "$\theta_M$" detected by the geomagnetic sensor 30.

That is, as the value of "$\alpha$" is large and the value of "$\beta$" is small (namely, good geomagnetic conditions), the corrected azimuth "$\theta_3$" approaches the value of "$\theta_M$" earlier with respect to the time lapse.

The azimuth "$\theta_3$" detected as mentioned above in step 326 is set to the final desired vehicle azimuth, and also is subsequently used as the reference vehicle azimuth "$\theta$" in the accumulated drive distance calculation interrupting process in step 108.

On the other hand, the value of "$\theta_M$" is stored as "$\theta_{MOLD}$" into the RAM 50F in FIG. 4, thereby preparing for the next interruption calculating process (step 328).

As previously described, the above-described azimuth calculation interrupting process is executed in the processor 50 shown in FIG. 4 in accordance with a predetermined system program stored in the program ROM 50B.

VARIATIONS IN CALCULATED AZIMUTH

Variation conditions of the vehicle's present azimuth calculated by the vehicle azimuth detecting apparatus according to the embodiment shown in FIG. 3 with respect to the time lapse will now be described in detail with reference to FIGS. 8 to 10.

These diagrams relate to the cases where the vehicles are driven on "a straight road". That is, the geomagnetic-field conditions are disturbed in this condition.

Figure 8:
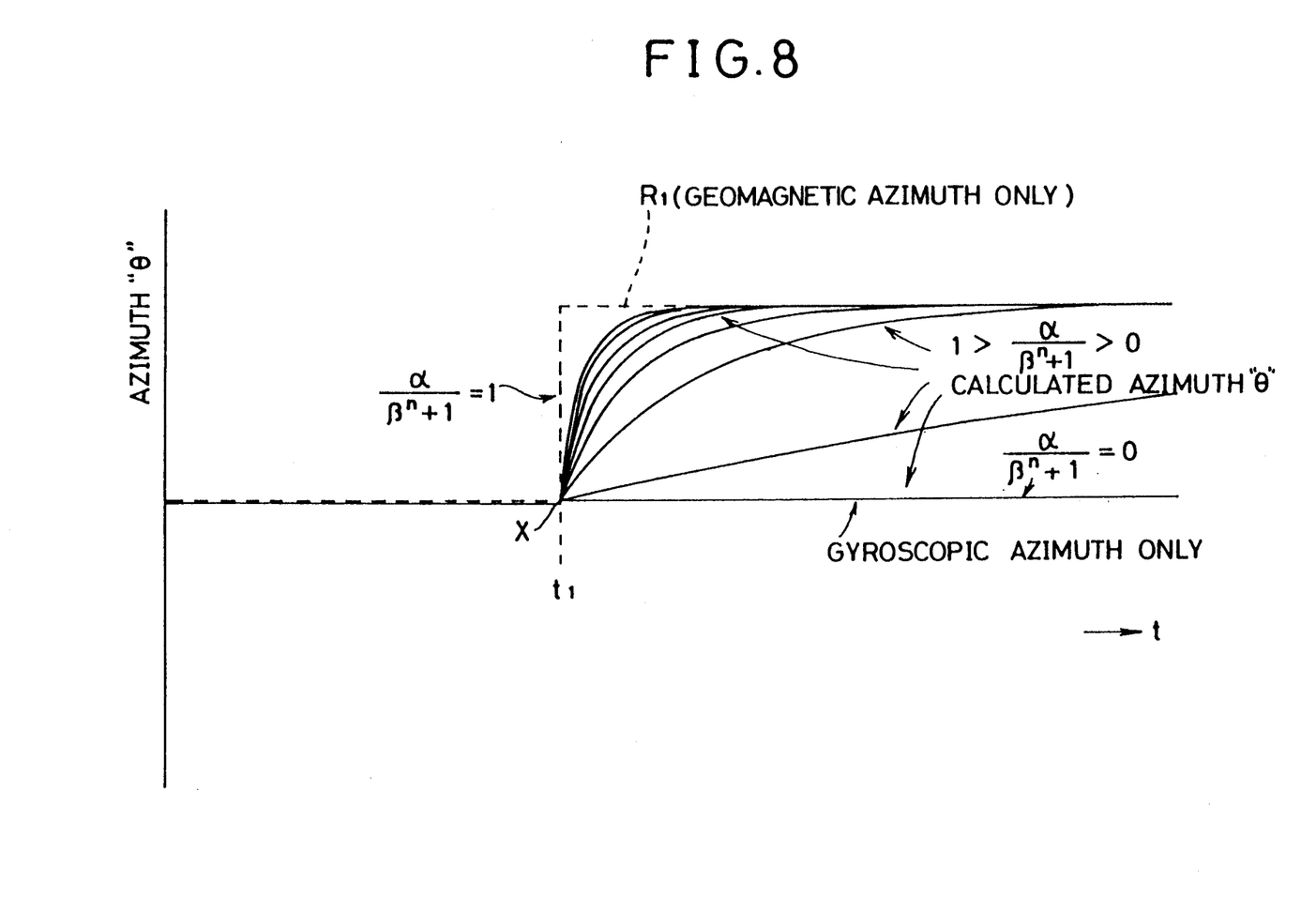
FIGS. 8 to 10 are diagrams for explaining the typical detecting operation for calculated azimuths in the system of FIG. 3.

In the example of FIG. 8, the geomagnetic azimuth detected by the geomagnetic sensor 30 (FIG. 3) is indicated by a broken line "$R_1$". However, the geomagnetic azimuth is suddenly adversely influenced by the geomagnetic-field conditions around the vehicle at point "X" (time instant "$t_1$") and the broken line "$R_1$" indicative of the geomagnetic azimuth changes like a step.

In such a case, the azimuth "$\theta$" calculated by the apparatus of the embodiment is gradually coincident with the geomagnetic azimuth "$R_1$" with the elapse of time as shown in FIG. 8.

In this case, an approaching speed (i.e., a time duration for coincidence) is settled early to the geomagnetic azimuth "$R_1$" (that is, upper curves in FIG. 8) as the value of $\alpha/(\beta^n + 1)$ in the equation (2) becomes large.

As a result, as an extreme example, when the value of $\alpha/(\beta^n + 1) = 0$ (that is, when the value is small), the gyroscopic azimuth obtained by the gyroscopic sensor 40 may be directly used as the calculated azimuth. On the contrary, when the value of $\alpha/(\beta^n + 1) = 1$ (namely, when the value is large), the geomagnetic azimuth obtained by the geomagnetic sensor 30 is directly used as the calculated azimuth.

Figure 9:
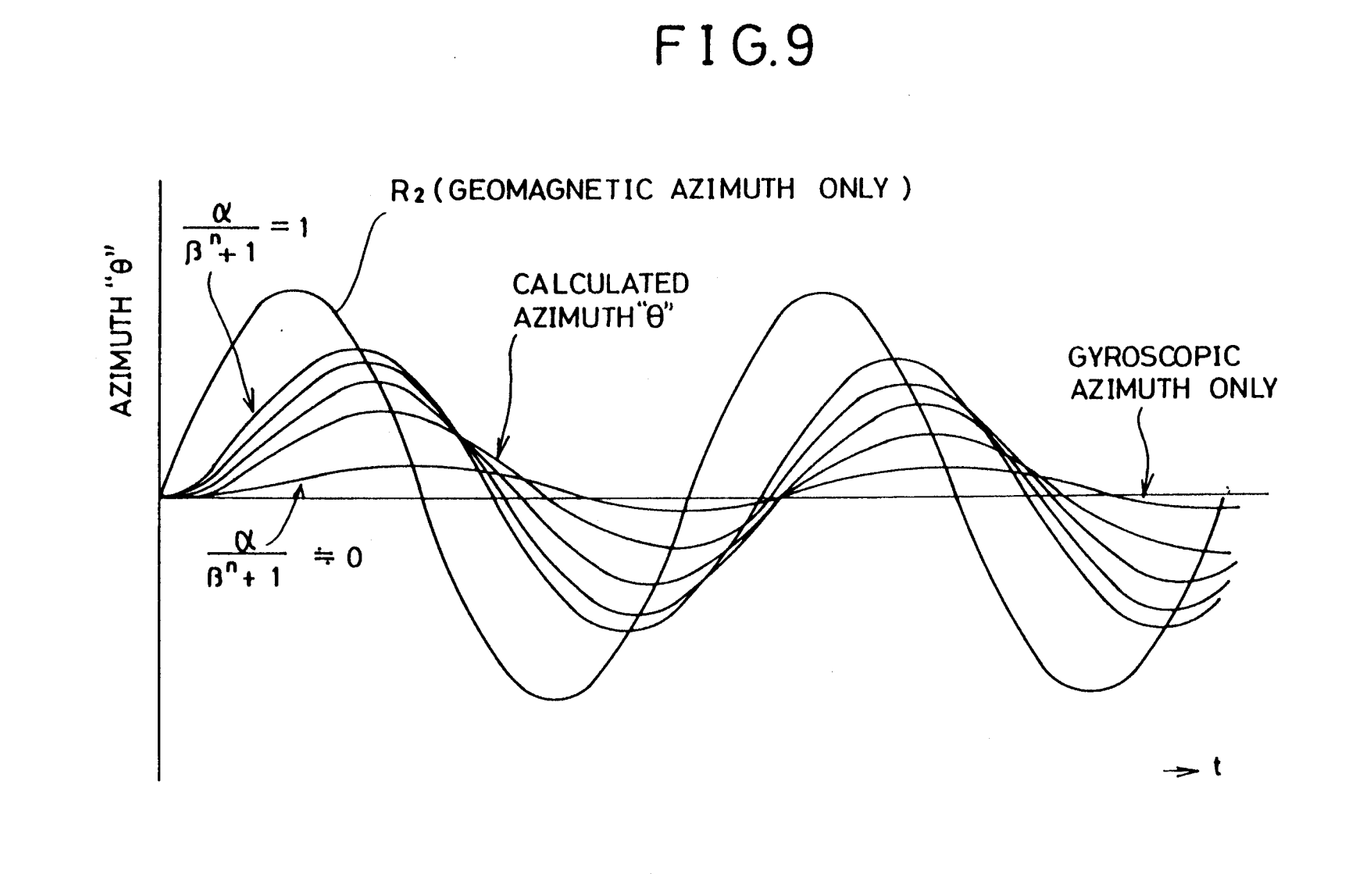

The next example as shown in FIG. 9 relates to the case where the disturbance of the geomagnetic-field conditions is represented by a sine curve and also an azimuth "$R_2$" calculated by only the geomagnetism similarly draws a sine curve.

Even in this example, as the value of $\alpha/(\beta^n + 1)$ is large (i.e., $\alpha/(\beta^n + 1) \approx 1$), the calculated azimuth approaches the geomagnetic azimuth "$R_2$". As the value of $\alpha/(\beta^n + 1)$ is small (i.e., $\alpha/(\beta^n + 1) \approx 0$), the calculated azimuth approaches the azimuth detected by the gyroscopic sensor 40.

As previously described, the gyroscopic azimuth detected by the gyroscopic sensor 40 is adversely influenced by the zero-point drift and is gradually deviated when considering a very long time period. That is, the time periods of the previous cases shown in FIG. 8 and 9 are selected to be, e.g., 0.5 seconds, whereas the time period of this case is selected to be, e.g., 10 minutes.

Figure 10:
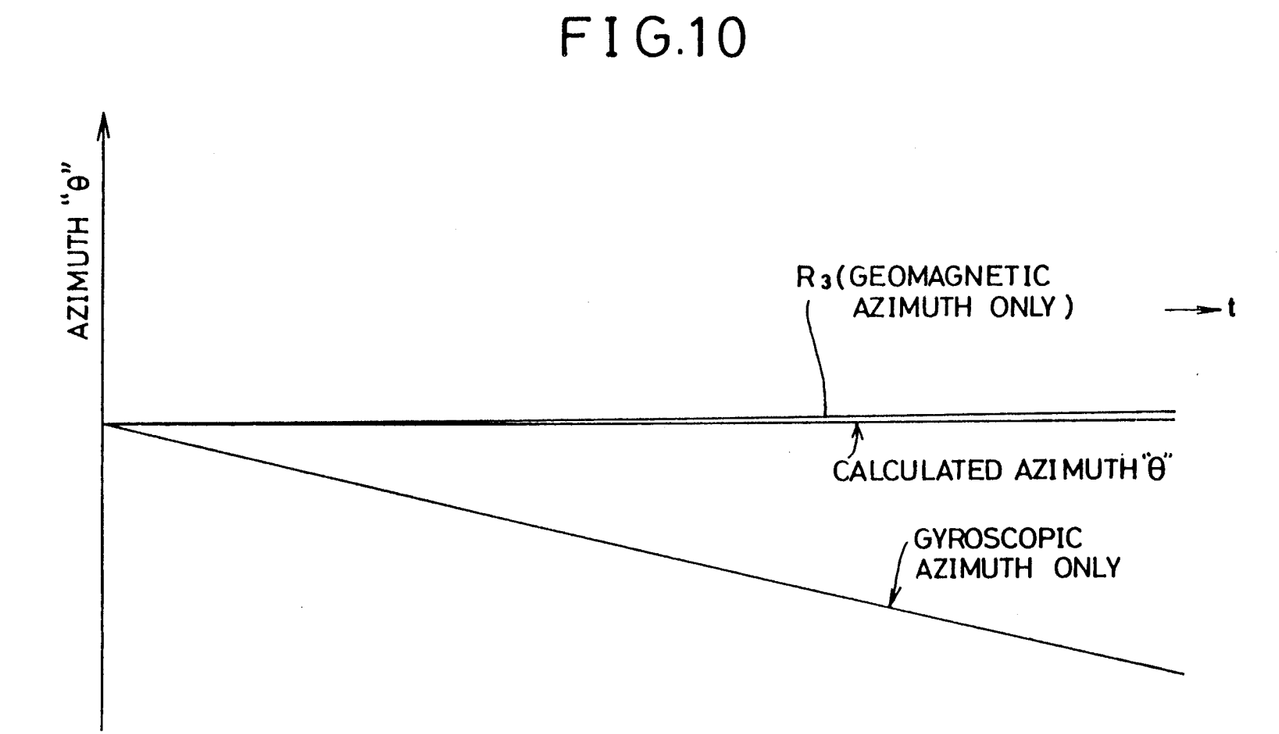

FIG. 10 shows an example in which in such a case, the adverse influence by the zero-point drift is eliminated and the calculated azimuth is settled to the direction of the geomagnetic azimuth "$R_3$" calculated by only the geomagnetic sensor.

When considering the case where the vehicle is running on a straight road in such a long time scale, the gyroscopic azimuth detected by only the gyroscopic sensor 40 is gradually deviated as shown in FIG. 10.

On the other hand, such a tendency does not exist in the geomagnetic azimuth "$R_3$" detected only by the geomagnetic sensor 30, and therefore the absolute azimuth is accurately output.

In such a case, in the apparatus of the embodiment, the calculated azimuth is stable at substantially the same position as the geomagnetic azimuth "$R_3$".

Therefore, it will be understood that according to the apparatus of the embodiment, the adverse influence by the zero-point drift of a long time duration can be eliminated.

Although the constants of "$\alpha$", "n", "$\Delta t$", "M" etc. have been used in the equations in the apparatus of the embodiment, for instance, the values of $\alpha=0.5$, $n=2$, $\Delta t=50$ msec., $M=20$, and the like may be used.

As mentioned above, in the vehicle driving azimuth detecting apparatus according to the invention, the good or bad geomagnetic-field conditions around the vehicle are judged by calculating the difference between the variation amount in the geomagnetic azimuth which is detected by the geomagnetic sensor and the variation amount of the gyroscopic azimuth which is detected by the gyroscopic sensor every driving time unit. On the basis of the calculation result, when the geomagnetic-field conditions are bad, the calculated vehicle azimuth is more slowly made to approach the geomagnetic azimuth. On the contrary, when the geomagnetic-field conditions are good, the calculated vehicle azimuth is made to approach the geomagnetic azimuth earlier with respect to the time lapse. Therefore, there are particular advantages such that the accurate absolute (geomagnetic) azimuth can be detected without being adversely influenced by the disturbances of the geomagnetism and the desired present azimuth of the vehicle can be detected at a high precision over the entire drive distance.

What is claimed is:

1. An apparatus for detecting a present driving azimuth of a vehicle, said apparatus comprising:
    a geomagnetic sensor which senses a plurality of geomagnetic azimuth values of said vehicle to produce a first geomagnetic variation amount in said plurality of geomagnetic azimuth values;
    a gyroscopic sensor which senses a plurality of gyroscopic azimuth values of said vehicle to produce a second gyroscopic variation amount in said plurality of gyroscopic azimuth values;
    a processor which determines a geomagnetic condition surrounding said vehicle by calculating a difference between said first geomagnetic variation amount and said second gyroscopic variation amount and outputs a geomagnetic condition signal representative of geomagnetic conditions surrounding said vehicle, said processor also determining said present driving azimuth of said vehicle based on said difference between said first geomagnetic variation amount and said second gyroscopic variation amount and on said geomagnetic condition signal such that a plurality of differences of said first geomagnetic variation amount and said second gyroscopic variation amount are acquired and averaged to obtain an averaged difference according to $$\beta = \sum_{1}^{M} |\Delta\theta_G - \Delta\theta_M|/M,$$

where M is a number of azimuth detections ($M \geq 2$), $\Delta\theta_G$ is said second gyroscopic variation amount, and, $\Delta\theta_M$ is said first geomagnetic variation amount and said present driving azimuth $\theta_3$ is generated according to $$\theta_3 = \{\alpha/(\beta^n+1)\}\cdot(\theta_M-\theta_2)+\theta_2,$$

where $\alpha$ is a first constant ($0 \leq \alpha \leq 1$), n is a second constant, $\theta_M$ is said geomagnetic azimuth, and $\theta_2$ corresponds to $\Delta\theta_G+\theta_3$ acquired in a previous azimuth detection.

2. An apparatus as claimed in claim 1, wherein said apparatus further includes
    a keyboard for inputting initial vehicle location data into said processor;
    a drive distance sensor for sensing a drive distance of said vehicle to supply a drive-distance signal to said processor; and
    a display unit for displaying a present location of said vehicle on a map on a display screen based on said present driving azimuth, said initial vehicle location data, and said drive distance.

3. An apparatus as claimed in claim 2, further comprising:
    a central processing unit;
    a program for previously storing a system program utilized in said central processing unit;
    a map data read only memory for previously storing a plurality of map data;
    a display controller, connected to said display unit, for controlling display data containing said map data to be displayed on said display unit;
    an interrupt controller for interrupting said system program to execute detection of said present driving azimuth of said vehicle; and
    a timer controller for controlling interrupting operation by said interrupt controller to execute said detection of said present driving azimuth of said vehicle at a predetermined time interval.

4. An apparatus as claimed in claim 3, further comprising:
    a first analog-to-digital converter, connected to said gyroscopic sensor, for analog-to-digital-converting a gyroscopic sensing signal derived from said gyroscopic sensor to obtain said gyroscopic azimuth;
    a second analog-to-digital converter, connected to said geomagnetic sensor, for analog-to-digital converting a geomagnetic sensing signal derived from said geomagnetic sensor to obtain said geomagnetic azimuth; and,
    waveform shaping means, connected to said drive distance sensor, for shaping a waveform of said drive-distance sensing signal to obtain drive-distance sensing data.

5. An apparatus as claimed in claim 4, further comprising a keyboard interface connected to said keyboard, for entering data into said processor.

* * * * *